Patented Apr. 26, 1949

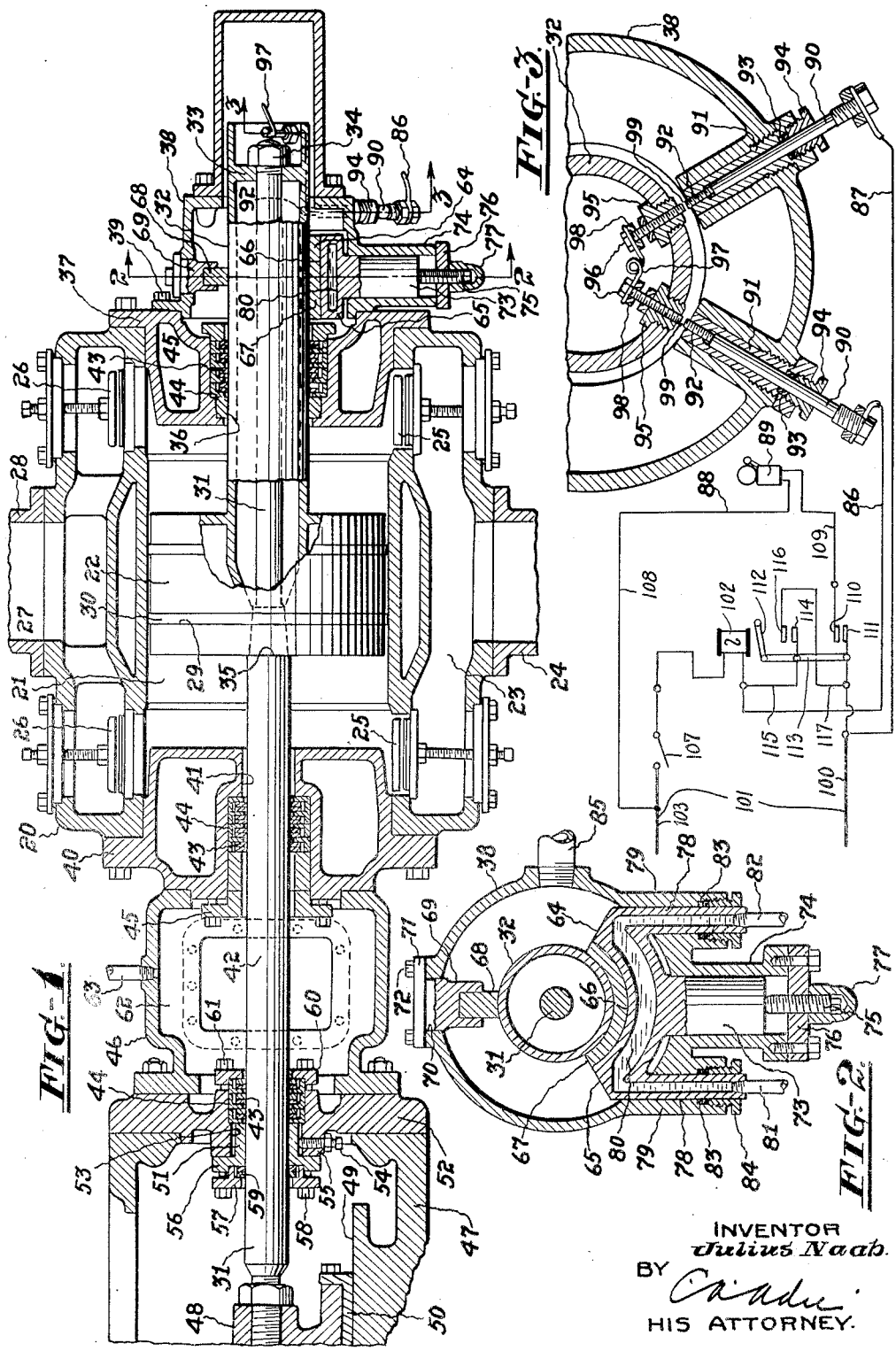

2,468,509

UNITED STATES PATENT OFFICE 2,468,509

BEARING WEAR INDICATING AND ADJUSTING DEVICE FOR PISTONS

Julius Naab, Easton, Pa., assignor to Ingersoll-Rand Company, New York, N. Y., a corporation of New Jersey Application November 15, 1945, Serial No. 628,935

2 Claims. (Cl. 177—311)

This invention relates to compressors, and more particularly to compressors used for compressing gases, chlorine gas for example, that have a deleterious effect upon oil lubricants.

One object of the invention is to obviate the necessity of using oil lubricants on those parts and surfaces of the compressor which are exposed to the medium being compressed.

Another object is to assure the correct axial alignment of the compressor piston with the chamber containing it.

Other objects are to enable adjustments required for maintaining the piston in or returning it to the correct operative position with respect to the piston chamber to be quickly effected and made from the exterior of the compressor without requiring the breaking of any of the sealing surfaces of the compressor casing.

A further object is to cause the sounding of a warning signal whenever the surfaces supporting the piston become worn to a certain predetermined degree.

Other objects will be in part obvious and in part pointed out hereinafter.

In the drawings accompanying this specification and in which similar reference numerals refer to similar parts, Figure 1 is a longitudinal elevation, partly broken away, of a horizontal compressor equipped with an adjusting device constructed in accordance with the practice of the invention, and Figures 2 and 3 are transverse views taken through Figure 1 on the lines 2—2 and 3—3, respectively.

Referring more particularly to the drawings, 20 designates a compressor cylinder having a piston chamber 21 and a reciprocatory piston 22 therein to compress fluid medium, as for example chlorine gas, in the opposed ends of the piston chamber 21. Such gas is conveyed to an inlet chamber 23 in the cylinder by a conduit 24. Its admission to the piston chamber 21 is controlled by inlet valves 25 at the ends of the piston chamber, and discharge valves 26, similarly positioned, control the flow of compressed gas from the piston chamber into a chamber 27 having a discharge conduit 28.

The piston 22 has the usual grooves 29 in its periphery for the accommodation of sealing rings 30 of graphitic material and is mounted upon an intermediate portion of a rod 31 having an end portion lying in an extension 32 formed integrally with the piston. The extension 32 has an internal wall 33 near its outer or free end to receive the extremity of the rod 31, and a nut 34 threaded on the rod acts against the outer surface of the wall 33 to press the piston 22 against a shoulder 35 on the rod.

The extension 32 is reciprocable in a bore 36 of a cylinder head 37 and in a casing 38 held in sealing engagement with the outer end of the head by bolts 39. A head 40 forming a closure for the opposite end of the piston chamber 21 has an axial bore 41 through which extends, loosely, the opposite end 42 of the rod 31. The diameters of the bores 36 and 41 are sufficiently larger than those of the rod and the extension to avoid contact between these parts and contain groups of rings, or segments, 43 of graphitic material for sealing engagement with the rod and the extension. The sealing rings 43 are arranged in metallic containers 44 positioned in end to end fashion in the bores 36 and 41 and said containers are held firmly against endwise movement by glands 45. The arrangement is such that only the sealing members 43 engage the rod, the containers 44 being recessed to avoid contact thereof with the piston parts.

The end 42 of the rod 31 extends through a distance piece 46 interposed between the head 40 and the main frame 47 of the compressor and is secured to and held against rotary movement by a crosshead 48 slidable on a guide 49 in the main frame 47. The crosshead 48 may be of a well known construction having a wearing shoe 50 that is adjustable on the crosshead to compensate for wear on the cooperating surfaces of said shoe and the guide 49.

The end portion 42 of the rod is additionally supported by a bearing sleeve 51 in the end wall 52 of the main frame and the bore 53 containing the bearing sleeve is of sufficiently large diameter to permit adjustment of the bearing sleeve transversely of the bore 53. Such adjustment may be conveniently effected by a screw 54 threaded into a boss 55 on the wall 52 and acting against the under-side of the bearing sleeve 51, and on the bearing sleeve is an external flange 56 that abuts the boss 55 and is held thereagainst by a gland 57 and bolts 58 extending through the gland and the flange 56 into the boss 55.

A suitable packing device 59 encircling the rod 31 is retained in position by the gland 57 and the opposed end of the bearing sleeve 51. In the end of the bore 53, adjacent the distance piece 46, are sealing members 43 of the same nature as those contained in the cylinder heads, their containers 44 being clamped securely in position by a plate 60 and bolts 61.

These sealing members 43, like those in the cylinder heads, are of smaller diameter than the chambers in the containers 44 wherein they are arranged so that they will be capable of movement with the rod in a transverse direction without coming into contact with the outer walls of such chambers and be damaged or crushed by the pressure of the piston rod.

As is customary in compressors handling chlorine gas, the interior of the distance piece 46 constitutes a chamber 62 that is sealed against leakage of gas to the atmosphere and any gas that may find its way into the distance piece will escape through a conduit 63 that may lead to the inlet side of the compressor or to a suitable pump (not shown) for evacuating the chamber 62.

The opposite end of the piston assembly is supported by bearing means designated in general by 64 and positioned in the casing 38 for cooperation with the extension 32. The bearing means 64 comprises a holder 65 that lies beneath the extension 32 and has an arcuate surface 66 at its upper end to support a bearing member 67 in the form of a segment of graphitic carbon which may be bonded, as by shellac or cement, to the surface 66. The extension 32 is retained on the bearing member by a guide piece 68, also of graphitic carbon, that bears against the upper surface of the extension 32 and is held in position by a plug 69 in an aperture 70 in the casing 38 and having a flange 71 that is secured to the outer surface of the casing by bolts 72.

The holder 65 is adjustable radially of the extension 32 to position the extension for engagement with the guide piece 68 and to shift the extension 32 and thus the piston 22 radially for bringing the extension into engagement with the guide piece. To this end the holder 65 is provided, at the intermediate portion of its under-side, with a stem 73 that extends slidably through an annular radially extending projection 74 on the side of the casing 38. The outer end of the stem 73 rests upon a screw 75 threaded into a cover plate 76 for the end of the projection 74, and a cap nut 77 threaded on the outer end of the screw 75 seats against the cover plate 76 to prevent leakage of gas along the screw 75 to the atmosphere and to hold the screw 75 immovable.

As a preferred arrangement, the holder 65 is water cooled and is accordingly provided at its opposed sides with depending tubular portions 78 that lie in parallelism with the stem 73 and extend slidably through bosses 79 on the side of the casing 38. The inner ends of the tubular portions 78 open into a chamber 80, in the holder 65 and adjacent the bearing member 67, and attached to the outer ends of the tubular portions 78 are conduits 81 and 82 one of which may serve as a supply conduit for the chamber 80 and the other as a discharge conduit. Packing members 83 in the bosses 79 encircle the tubular portions 78 and are compressed by glands 84 threaded into the ends of the bosses.

A suitable outlet is provided for any gas that may leak from the piston chamber into the casing 38 by a pipe 85 which may be connected to the inlet side of the compressor, in the manner of the conduit 63.

Means are provided to give audible warning whenever the wear caused by the extension 32 on the bearing member 67 reaches a certain predetermined degree so that adjustment may be made for restoring the piston assembly to its correct assembled position in the compressor and thereby obviate the chances of the piston 22 coming in contact with the wall of the piston chamber 21. To this end, the terminals of the wires 86 and 87 of a circuit 88 for an electric bell 89 are connected to the outer ends of contactors 90 in the form of rods that extend radially into the casing 38. The rods are arranged in insulators 91 to which they are threadedly connected, for endwise adjustment, and their inner ends 92 project beyond the corresponding ends of the insulators 91 to points adjacent the plane of movement of the extension 32. The insulators are recessed at their outer ends for the accommodation of packing members 93 and glands 94 that serve to prevent leakage of gas along the contactors to the atmosphere.

The extension 32 also carries a pair of insulators 95 for contactors 96 in the form of screws that are positioned in the radial planes of the contactors 90 and have their head ends lying within the extension 32 and connected by a wire 97 that is clamped against the heads of the contactors 96 by nuts 98.

The contactors 90 and 96 are adjusted to such positions with respect to each other that there will exist between their opposed ends gaps 99 corresponding to the degree of wear that may safely be permitted on the bearing member 67 without danger of the piston 22 coming in contact with the wall of the piston chamber.

In the arrangement shown, the wire 87 is connected directly to a wire 100 of a primary circuit 101 and the wire 86 is connected to a relay 102 which controls the flow of electrical current to the bell 89 and may be connected with the other wire 103 of the circuit 101 by a switch 107. One wire 108 of the bell circuit 88 is also connected to the wire 103 and the other wire 109 of the bell circuit carries a contactor 110 for cooperation with a movable contactor 111 connected with the wire 100 for closing the bell circuit 88.

The movable contactor 111 is actuated by the armature 112 of the relay 102, being connected thereto by a rod 113 on the free end of the armature. The rod 113 is also connected to a movable contactor 114 on a wire 115 leading from the wire 86 for moving the contactor 114 into and out of engagement with a stationary contactor 116 of a wire 117 leading to the wire 100.

In practice, owing to the wearing away of the material of the bearing member 67, the extension 32 will descend gradually and when the extent of such wear approximates or equals the width of the gaps 99, the contactors 96, in moving across the ends of the contactors 90, will cause the relay 102 to become energized and attract the armature 112 thereto. This movement of the armature 112, transmitted by the rod 113, will bring the movable contactors 111 and 114, respectively, into engagement with the stationary contactors 110 and 112.

The circuits leading from one primary wire to the other through the relay and the alarm bell will then remain closed and the latter will continue sounding an alarm indicating the worn condition of the bearing 67 until the switch 107 is opened, even though the contactors 96 have moved out of circuit establishing relation with the contactors 90. Upon the sounding of the alarm bell 89 the bearing member 67 may be elevated to return the piston to coaxial relationship with the wall of the piston chamber by merely turning the screw 75 until the extension 32 again engages the guide piece 68.

Wear on the cooperating surfaces of the crosshead shoe 50 and its guide 49 may also be compensated for in the usual manner, and if such adjustment of the crosshead necessitates a repositioning of the sleeve 51 transversely of the bore 53 in order to avoid binding engagement thereof on the rod 31 thus may be accomplished by turning the screw 54 in the required direction.

These adjustments, as will be readily apparent, may be quickly and conveniently made from the exterior of the compressor and without necessitating the opening of any of the chambers or spaces to which the gas has access.

I claim:

1. In an adjusting device, a cylinder having a horizontal piston chamber, a casing on the cylinder, a reciprocatory piston in the piston chamber having an extension extending into the casing, means for preventing rotational movement of the extension, a bearing member for the extension, means for shifting the bearing member radially of the extension to compensate for wear thereon by the extension, a signaling device for indicating a predetermined degree of wear on the bearing member, and means on the extension for causing operation of the signaling device.

2. In an adjusting device, a cylinder having a horizontal piston chamber, a reciprocatory piston in the piston chamber having an extension, means for preventing rotational movement of the extension, a bearing member for the extension, means for shifting the bearing member radially of the extension to compensate for wear on the bearing member by the extension, a signal device, an electric circuit for the signal device, and contactors carried by the extension to close the electric circuit for operating the signal device whenever the wear on the bearing member reaches a certain predetermined degree.

JULIUS NAAB.

REFERENCES CITED

The following references are of record in the file of this patent:

UNITED STATES PATENTS

| Number | Name | Date |
|---|---|---|
| 111,768 | Norment | Feb. 14, 1871 |
| 723,387 | Hill | Mar. 24, 1903 |
| 1,067,382 | Solem | July 15, 1913 |
| 1,081,784 | Spohrer | Dec. 16, 1913 |
| 1,114,668 | Ash et al. | Oct. 20, 1914 |
| 2,320,110 | Walker | May 25, 1943 |

FOREIGN PATENTS

| Number | Country | Date |
|---|---|---|
| 118,360 | Great Britain | Aug. 29, 1918 |
| 663,793 | France | Apr. 15, 1929 |